United States Patent [19]

Egan

[11] Patent Number: 5,038,041

[45] Date of Patent: * Aug. 6, 1991

[54] FILTER STRUCTURE HAVING COMBINED WAVELENGTH AND POLARIZATION SENSITIVE CHARACTERISTICS

[75] Inventor: Walter G. Egan, Woodhaven, N.Y.

[73] Assignee: Grumman Aerospace Corporation, Bethpage, N.Y.

[*] Notice: The portion of the term of this patent subsequent to Jul. 31, 2007 has been disclaimed.

[21] Appl. No.: 325,693

[22] Filed: Mar. 20, 1989

[51] Int. Cl.$^5$ .......................... G02B 5/30; G02B 5/28
[52] U.S. Cl. .................................. 250/349; 250/332; 250/339; 359/589; 359/489; 359/498
[58] Field of Search .............. 350/164, 165, 166, 370, 350/384, 388, 396, 397, 404, 406, 400, 401, 407, 408; 250/332, 342, 339, 349, 338.1

[56] References Cited

U.S. PATENT DOCUMENTS

| | | | |
|---|---|---|---|
| 2,309,629 | 2/1943 | Conrad | 350/408 |
| 3,544,193 | 12/1970 | Laput | 350/150 |
| 3,631,254 | 12/1971 | Covault | 250/225 |
| 3,771,857 | 11/1973 | Thomasson et al. | 350/166 |
| 3,897,136 | 7/1975 | Bryngdahl | 350/159 |
| 3,981,568 | 9/1976 | Bartolomei | 350/317 |
| 4,423,325 | 12/1983 | Foss | 250/332 |
| 4,743,092 | 5/1988 | Pistor | 250/370 |
| 4,764,670 | 8/1988 | Pace et al. | 250/226 |

Primary Examiner—Constantine Hannaher
Assistant Examiner—Edward J. Glick
Attorney, Agent, or Firm—Scully, Scott, Murphy & Presser

[57] ABSTRACT

A radiation filter structure having combined wavelength and polarization sensitive characteristics and which is constructed on a single substrate. A plurality of different wavelength ($\lambda 1$ to $\lambda n$) interference filter coatings are applied to different areas of the filter substrate as a plurality of parallel adjacent stripes, such that different wavelengths $\lambda 1$ to $\lambda n$ are passed by the different stripe areas. Moreover, a plurality of different polarization filters of both parallel polarization or perpendicular polarization, are also applied as a plurality of parallel adjacent stripes to the different areas of the filter substrate. The arragement includes first and second interference filter stripes for each wavelength $\lambda 1$ to $\lambda n$, and a parallel polarization filter for each first stripe for each wavelength $\lambda 1$ to $\lambda n$, and a perpendicular polarization filter for each second stripe for each wavelength $\lambda 1$ to $\lambda n$, such that parallel and perpendicular polarization components are passed, and can be detected, for each wavelength $\lambda 1$ to $\lambda n$. In different disclosed embodiments the interference filter stripes and the polarization filter stripes are applied to either opposite sides or the same side of the substrate, and can extend along the length or across the width of the substrate. Moreover, the substrate can be formed by a radiation detector array, over which the interference filter stripes and the polarization filter stripes are applied.

14 Claims, 4 Drawing Sheets

FILTER STRUCTURE HAVING COMBINED WAVELENGTH AND POLARIZATION SENSITIVE CHARACTERISTICS

BACKGROUND OF THE INVENTION

1. Field of the Invention

The present invention relates generally to a radiation filter structure having combined wavelength sensitive and polarization sensitive characteristics.

More particularly, the subject invention pertains to a radiation filter structure as described fabricated on a single substrate in which different areas of the substrate are coated with different wavelength interference filter coatings, and further wherein polarization filters having both parallel and perpendicular polarizing filtering characteristics are applied onto the substrate in association with the different wavelength interference filter coatings.

The radiation filter structure of the present invention is particularly suitable for use with focal plane array radiation detectors. The radiation filter structure of the subject invention may be used to produce color (wavelength) and polarization sensitivity characteristics for recently developed square micro infrared detectors having sizes between 0.001 and 0.004 inches. These new detectors are composed of materials such as indium antimonide, platinum silicide and mercury-cadmium-telluride, for instance.

There is a need in advanced military infrared systems for wavelength dependent polarization filters which arises because military targets and their backgrounds have different and distinguishable infrared polarization characteristics. Moreover, such military targets and their backgrounds also have polarization properties of both emitted and scattered radiation. Although present military electro-optical systems do not specifically have polarization sensitivity designed into them, recent developments in the mathematical analysis of such optical systems allow polarization sensitive systems to be designed and constructed.

2. Discussion of the Prior Art

Interference optical filters and their manner of construction and characteristics are well known in the optical arts. U.S. Pat. Nos. 3,771,857 and 3,981,568 are of particular interest to the present invention by disclosing technology for producing multifrequency striped interference filters which can be utilized in the present invention. U.S. Pat. No. 3,981,568 in particular discloses a technological method for producing a striped dichroic filter on a substrate. The surface of the substrate supports a first set of spaced parallel stripes capable of reflecting a first color and a second set of spaced parallel stripes capable of reflecting a second color. The first and second sets of stripes are disposed parallel to each other and in abutting relationship with no space or overlap between adjacent stripes. Third and additional sets of stripes for reflecting other colors may also be provided pursuant to the disclosure of this patent. In the method for making the striped dichroic filter, a dual lift-off procedure is used which utilizes both metal and resist lift-off techniques that are mutually exclusive.

Polarization optical filters and their manner of construction and characteristics are also well known in the optical arts. Polarization can be useful in the detection of specific targets as the polarization properties of particular targets frequently differ from the polarization properties of background radiation, and both have attributes of both emitted and scattered radiation. The production of polarized radiation is quite common in nature, and occurs in sky and sunlight reflection and scattering from water and land surfaces, roads and highways, windows, and vehicle bodies, to name a few instances. However, the use of polarization analysis in remote sensing has often been limited to astronomy, where every bit of information available in the optical spectral region must be utilized in analyses.

In order to sense or detect polarization in an electromagnetic wave, an optical element is necessary that responds nonuniformly to the vector directional property of the incident radiation. Such devices are available as polaroids, wire grid polarizers, dichroic polarizers, piles of plates, double refraction prisms, or asymmetrical scatters. The oldest instrument for analyzing polarization is the wire grid which was first used as a polarizer in 1888 to evaluate the properties of the then recently discovered radio waves. By orienting the grid either parallel or perpendicular to the electric vector of the radiation, the electric field is either short circuited or permitted to pass therethrough, respectively.

This same principle was extended into the infrared in 1911 for polarization analyses of radiation from 24 to 314 $\mu$m. One recent application was in 1960 in which wire grids were made by evaporating gold onto a plastic replica of a diffraction grating. Such grids are available commercially from Perkin-Elmer with transmission in the wavelength range from 2.5 $\mu$m to well beyond 333 $\mu$m. The polarization properties of these wire grid polarizers are shown in FIG. 6., which is a plot of the ratio of the intensity of the parallel component of polarization to the perpendicular component as a function of wavelength. The larger the ratio, the better the performance as an analyzer.

In 1938 the chemical analog of the wire grid was invented. Long, thin polymer molecules aligned nearly parallel to each other, with high conductivity produced by free electrons associated with iodine atoms in the molecules, serve to absorb the electric field parallel to the molecules, and the perpendicular component passes through with a small absorption. Pursuant thereto, various sheet polarizers are available from the Polaroid Corporation with usable wavelength ranges covering the region from 375 nm to 2.0 $\mu$m. Minneapolis Honeywell also manufactures ultraviolet polarization analysers.

The polarization filtering techniques described hereinabove are applicable and pertinent to the present invention to the extent that they can be utilized to produce a filter structure on a substrate as described in greater detail hereinbelow.

SUMMARY OF THE INVENTION

Accordingly, it is a primary object of the present invention to provide a radiation filter structure having combined wavelength sensitive and polarization sensitive characteristics.

A further object of the subject invention is the provision of a radiation filter structure having combined wavelength sensitive and polarization sensitive characteristics fabricated on a single substrate. Further wherein different areas of the substrate are coated with different wavelength interference filter coatings and in which polarization filters having both parallel and perpendicular polarized filtering characteristics are applied onto the substrate in association with the different wavelength interference filter coatings thereon.

In accordance with the teachings herein, the present invention provides a radiation filter structure having combined wavelength and polarization sensitive characteristics which is constructed on a single filter substrate. A plurality of different wavelength (λ1 to λn) interference filter coatings are applied to different areas of the filter substrate such that different wavelengths λ1 to λn are passed by the different areas. Moreover, a plurality of different polarization filters, of either parallel polarization or perpendicular polarization, are also applied to the different areas of the filter substrate. The arrangement is such that some of the areas of the filter substrate pass radiation of parallel polarization, and others of the different areas pass radiation of perpendicular polarization.

In greater particularity, in preferred embodiments, the plurality of different wavelength coatings are applied as a plurality of parallel adjacent coating stripes. The arrangement includes first and second stripes for each wavelength λ1 to λn, a parallel polarization filter for each first stripe for each wavelength λ1 to λn, and a perpendicular polarization filter for each second stripe for each wavelength λ1 to λn, such that parallel and perpendicular polarization components are passed, and can be detected, for each wavelength λ1 to λn.

In a first disclosed embodiment, the plurality of parallel adjacent interference filter coating stripes are applied on a first side of the substrate extending along the length thereof, and the plurality of different polarization filters are applied to the opposite second side of the substrate as stripes in parallel and aligned with the interference filter stripes. In a second disclosed embodiment, the plurality of different wavelength coatings are applied as a plurality of interference filter coating stripes extending across the width of the substrate, and the plurality of different polarization filters are applied to the second side of the substrate as stripes in parallel and aligned therewith. In yet a third embodiment, the plurality of parallel adjacent interference filter coating stripes and the plurality of different polarization filter stripes are both applied on the same side of the substrate, with the plurality of different polarization filters preferably being applied over the plurality of parallel adjacent interference filter coating stripes, which are applied directly to the surface of the substrate. Moreover, the interference filter stripes and the polarization filter stripes might be placed orthogonally relative to each other in some embodiments, which might facilitate data processing by outputting the data in a different format.

In one advantageous embodiment disclosed herein, the substrate for the filter structure is formed directly by a radiation detector array which preferably comprises a focal plane array radiation detector. In this embodiment, a passivating layer can be applied intermediate the radiation detector array and the filters or filter coatings to prevent any possible damage to the underlying radiation detector array.

In all of the disclosed embodiments, the plurality of different wavelength coating stripes include first and second stripes for each wavelength λ1 to λn, and further include a parallel polarization filter for each first stripe for each wavelength λ1 to λn, and a perpendicular polarization filter for each second stripe for each wavelength λ1 to λn, such that parallel and perpendicular polarization components are passed for each wavelength λ1 to λn.

BRIEF DESCRIPTION OF THE DRAWINGS

The foregoing objects and advantages of the present invention for a filter structure having combined wavelength and polarization sensitive characteristics may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 2:
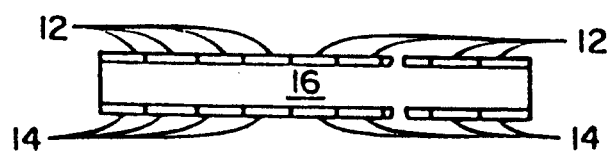
FIGS. 1 and 2 are respectively top planar and cross sectional views of a first embodiment of the present invention in which stripes of an interference filter coating and stripes of polarization filters extend lengthwise along a base substrate.
Figure 1:
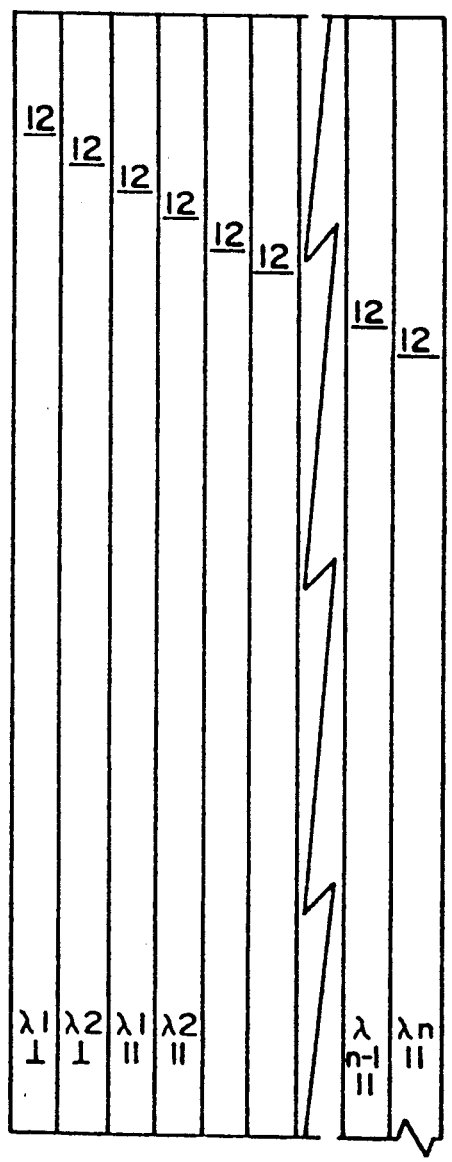

Referring to the drawings in detail, FIGS. 1 and 2 are respectively top planar and cross sectional views of a first embodiment of the present invention in which stripes 12 of an interference filter coating extend lengthwise along a base substrate 16 on one side thereof, and stripes 14 of parallel and perpendicular polarization filters extend in correspondence and parallel therewith on the second opposite side of the substrate. The dimensions given in the drawings are in inches.

The organization of the stripes is such as to pass, from left to right referring to the bottom of FIG. 1, radiation at a first wavelength λ1 with a perpendicular polarization component, hereby designated λ1⊥, radiation at a second wavelength λ2 with a perpendicular polarization component, λ2⊥, radiation at a wavelength λ1 with a parallel polarization component, hereby designated λ1 ∥, and similarly λ2 ∥ . . . to λn−1 ∥, λn ∥.

The substrate 16 is chosen of a material suitable to pass the wavelengths of interest, and in infrared embodiments an infrared transmitting substrate such as silicon, germanium or sapphire can be utilized.

The polarizing filters 14 preferably are composed of highly conducting continuous fine lines of metallic material such as gold, silver, copper or nickel or metallic or semiconducting alloys. The function of the fine metallic lines is to short circuit in one direction the electric component of the electromagnetic radiation incident on the filter and thus filter out one of the two polarization components. Thus, in each parallel polarization stripe 14, the fine lines are oriented perpendicular to the fine lines of each perpendicular polarization stripe 14, although the stripes extend in the same direction. The conducting lines may be formed on the substrate by using a photolithographic masking technique, or by ruling grooves on the substrate surface after evaporation of a continuous coating of the metallic line material. The technology to produce the polarizing side of the filter is already in existence. Gold line polarization filters one inch in diameter have been produced with 640 lines per millimeter (16256 lines/inch), thus having a center to center spacing of 0.0615 mil (one mil=0.001 inch). These filters are useful to a wavelength as short as 2.5 $\mu$m, with the longer wavelength limit being determined only by the transmission of the substrate (and to some extent, by the conductivity of the conducting lines).

Figure 6:
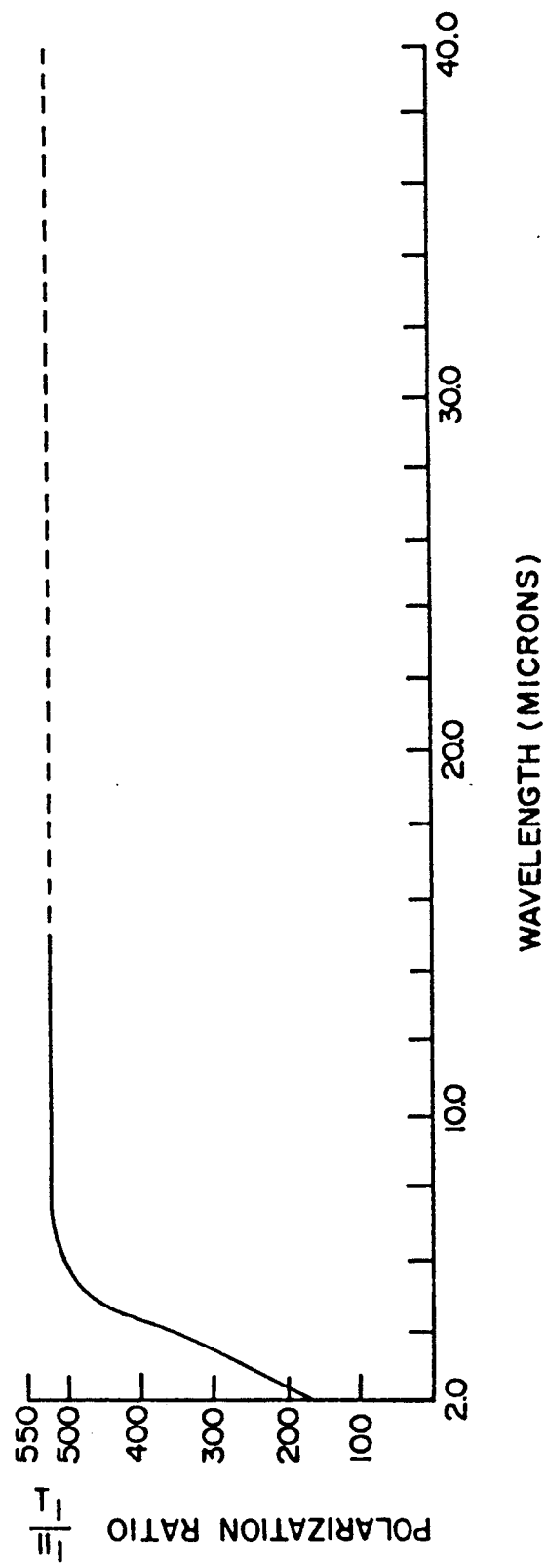
FIG. 6 illustrates the polarization properties of a radiation polarization filter constructed pursuant to the disclosure herein and shows a plot of the ratio of the parallel to perpendicular polarization components passed by the filter as a function of wavelength.

The approximate transmission of a polarization filter of this type is shown in FIG. 6. The polarization ratio is plotted as a function of the wavelength of the incident radiation in units of microns. The polarization ratio ($I \parallel / I\perp$) is the ratio of the parallel transmitted component to the perpendicular transmitted component. The curve represents the attenuation of the perpendicular polarized component as a function of wavelength. The attenuation becomes very significant ($\sim$250) at a wavelength of 2.5 $\mu$m and rises to $\sim$500 at a wavelength of 3.5 $\mu$m.

The different wavelength $\lambda 1$ to $\lambda n$ interference filter coatings 12 applied on the first side of the substrate can be applied pursuant to the dual lift-off procedure described in U.S. Pat. No. 3,981,568 for producing multifrequency striped interference filters. The different wavelength interference coatings could also be prepared by using photolithographic masking techniques. Alternatively, the different wavelength interference coating stripes and the polarization filters could be prepared independently and then cemented together as one unit.

Photolithographic techniques, using either laser microlithography or electron microlithography, as have been developed and used in very large scale integrated (VLSI) circuits, are also suitable to construct embodiments of the present invention, and for the fabrication of either or both of the interference filter stripes and the polarization filter stripes.

Figure 4:
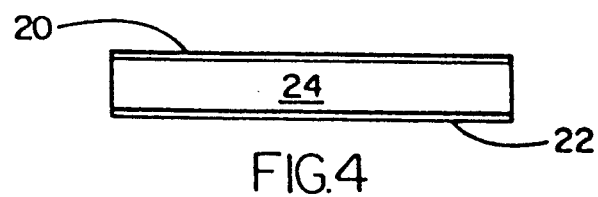
FIGS. 3 and 4 are respectively top planar and cross sectional views of a second embodiment of the subject invention in which stripes of an interference filter coating and stripes of polarization filters extend widthwise across a base substrate.
Figure 3:
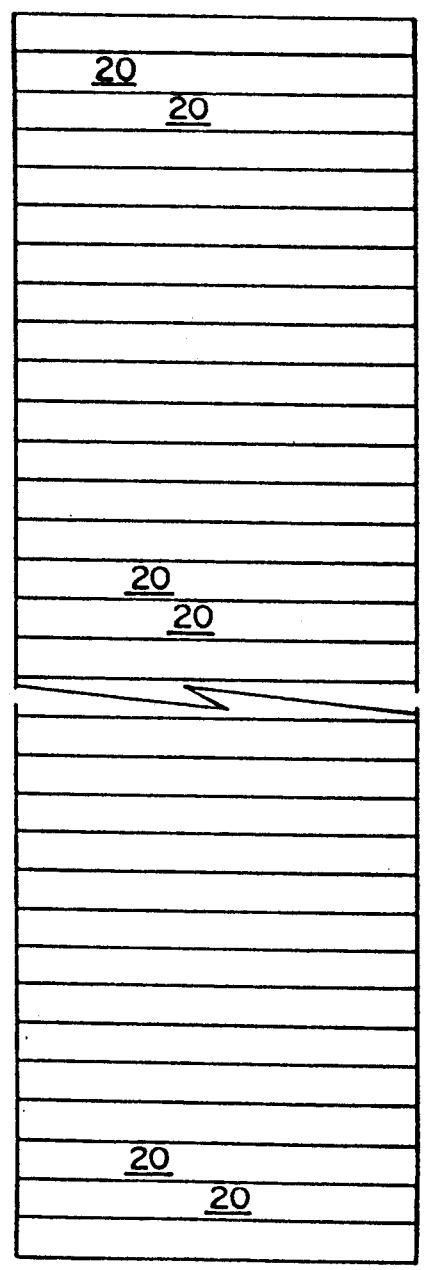

FIGS. 3 and 4 are respectively top planar and cross sectional views of a second embodiment of the subject invention in which stripes 20 of an interference filter coating and stripes 22 of the polarization filters extend widthwise across a base substrate 24.

In the embodiments of FIGS. 1-4, the polarizing filters are stripes of the same dimension and extend in the same direction as the interference filter stripes. In particular applications of the filter structure of the present invention, they are used in association with focal plane array sensors which comprise an n$\times$m array of detectors positioned in a focal plane, which will determine the dimensions and requirements of the particular filter structure. Moreover, in some embodiments, the stripes of interference filters might run perpendicular to the stripes (not the lines) of the polarization filters, which might facilitate data processing by outputting the data in a different order of format.

Figure 5:
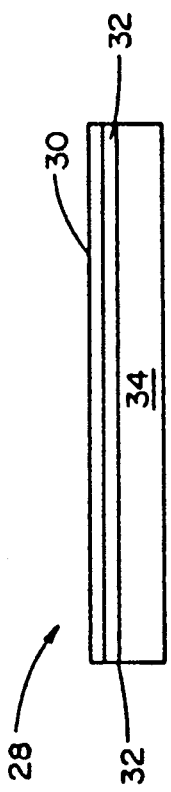
FIG. 5 is a cross sectional view of a third embodiment of the present invention in which interference filter coating stripes and polarization filter coating stripes are fabricated on the same side of the base substrate.

When the interference filter stripes are on one side of the substrate and the polarization filter stripes are on the second side of the substrate, as in the embodiments of FIGS. 1-4, it is possible to have some cross colorization or cross talk between the different channels defined by the stripes across the width of the substrate. Any such possible cross colorization can be minimized by the embodiment of FIG. 5 which is a cross sectional view of a third embodiment 28 of the present invention in which interference filter coating stripes 30 and polarization filter coating stripes 32 are mounted on the same side of a base substrate 34. Depending upon the particular design requirements and the application, the filter structure 28 might have the interference filter stripes and the polarization filter stripes extend along the length of the substrate, as in FIGS. 1 and 2, or extend across the width of the substrate, as in FIGS. 3 and 4, or possibly extend in perpendicular directions to facilitate the particular requirements of data processing. The embodiment of FIG. 5 can be constructed by fabricating the stripes of interference coating material on the substrate using any of the possible technical approaches described hereinabove, and then fabricating the polarization filter stripes thereover, either directly thereon, or over an intermediate passivating or buffer layer. If the polarization filter stripes are being fabricated by photolithographic techniques and the conductivity of the interference filter stripes does not interfere with operation of the polarization filters, then the latter filters could be fabricated directly on top of the stripes of the interference filters.

FIG. 6 illustrates the polarization properties of a radiation polarization filter constructed pursuant to the disclosure herein, with plots of the ratio of the parallel to perpendicular polarization components passed by the filter as a function of wavelength.

Figure 7:
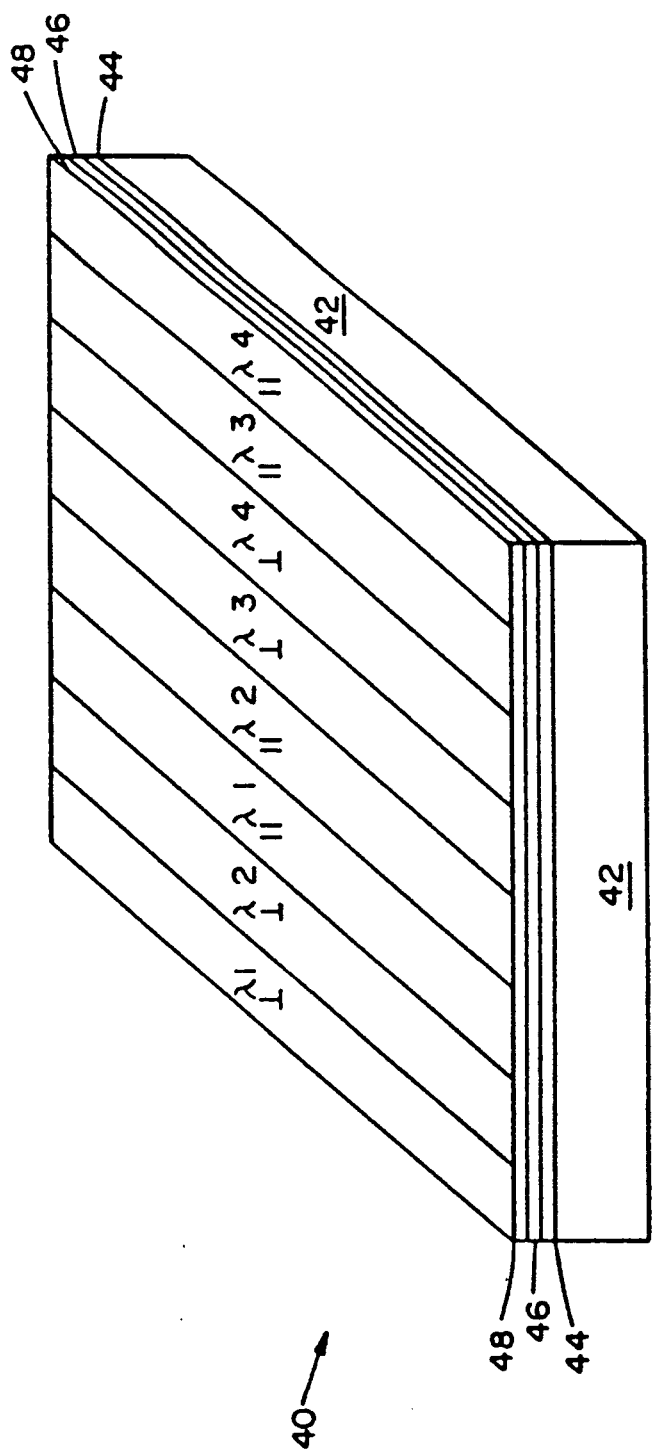
FIG. 7 illustrates a further embodiment of the subject invention in which interference filter coating stripes and polarization filter coating stripes are fabricated directly on the surface of a detector comprising a focal plane array sensor.

FIG. 7 illustrates a further embodiment 40 of the subject invention in which the interference filter coating stripes and the polarization filter coating stripes are fabricated on a substrate 42 formed by a detector array which can be a focal plane array sensor. The surface of the detector array can be protected by a passivating or buffer layer 44, over which the stripes of the polarization filter coatings 46 are applied over which the interference filter coating stripes 48 are applied, or vice versa.

While several embodiments and variations of the present invention for a filter structure having combined wavelength and polarization sensitive characteristics are described in detail herein, it should be apparent that the disclosure and teachings of the present invention will suggest many alternative designs to those skilled in the art.

What is claimed is:

1. A radiation filter structure having combined wavelength and polarization sensitive characteristics, comprising:
   a. a filter substrate;
   b. a plurality of different wavelength $\lambda 1$ to $\lambda n$ interference filter coatings applied to different areas of the filter substrate such that different wavelengths $\lambda 1$ to $\lambda n$ are passed by the different areas of the substrate; and
   c. a plurality of polarization filters including a plurality of parallel polarization filters applied to a first portion of all of said different areas of the filter substrate, such that a first portion of all of said different areas of the filter substrate pass radiation of parallel polarization, and a plurality of perpendicular polarization filters applied to a second portion of all said different areas of the filter substrate, such that a second portion of all of the different areas pass radiation of perpendicular polarization.

2. A radiation filter structure having combined wavelength and polarization sensitive characteristics, as claimed in claim 1, wherein said plurality of different wavelength interference filter coatings are applied as a plurality of different wavelength parallel adjacent interference filter coating stripes.

3. A radiation filter structure having combined wavelength and polarization sensitive characteristics, as claimed in claim 2, said plurality of different wavelength parallel adjacent interference filter coating stripes including first and second interference filter coating stripes for each wavelength λ1 to λn, and including a parallel polarization filter for each first interference filter coating stripe for each wavelength λ1 to λn, and a perpendicular polarization filter for each second interference filter coating stripe for each wavelength λ1 to λn, such that parallel and perpendicular polarization components are passed for each wavelength λ1 to λn.

4. A radiation filter structure having combined wavelength and polarization sensitive characteristics, as claimed in claim 3, wherein said plurality of different wavelength parallel adjacent interference filter coating stripes are applied on a first side of the substrate, and said plurality of polarization filters are applied as a plurality of parallel adjacent stripes to the opposite second side of the substrate.

5. A radiation filter structure having combined wavelength and polarization sensitive characteristics, as claimed in claim 4, wherein said plurality of different wavelength parallel adjacent interference filter coating stripes extend along the length of the substrate.

6. A radiation filter structure having combined wavelength and polarization sensitive characteristics, as claimed in claim 4, wherein said plurality of different wavelength parallel adjacent interference filter coating stripes extend across the width of the substrate.

7. A radiation filter structure having combined wavelength and polarization sensitive characteristics, as claimed in claim 2, wherein said plurality of different wavelength parallel adjacent interference filter coating stripes and said plurality of polarization filters are both applied on the same side of the substrate.

8. A radiation filter structure having combined wavelength and polarization sensitive characteristics, as claimed in claim 7, wherein said plurality of polarization filters are applied over the plurality of different wavelength parallel adjacent interference filter coating stripes, which are applied directly onto the surface of the substrate.

9. A radiation filter structure having combined wavelength and polarization sensitive characteristics, as claimed in claim 7, wherein said plurality of different wavelength parallel adjacent interference filter coating stripes extend along the length of the substrate.

10. A radiation filter structure having combined wavelength and polarization sensitive characteristics, as claimed in claim 7, wherein said plurality of different wavelength parallel adjacent interference filter coating stripes extend across the width of the substrate.

11. A radiation filter structure having combined wavelength and polarization sensitive characteristics, as claimed in claim 7, wherein said plurality of different wavelength parallel adjacent interference filter coating stripes including first and second stripes for each wavelength λ1 to λn, and including a parallel polarization filter for each first stripe for each wavelength λ1 to λn, and a perpendicular polarization filter for each second stripe for each wavelength λ1 to λn, such that parallel and perpendicular polarization components are passed for each wavelength λ1 to λn.

12. A radiation filter structure having combined wavelength and polarization sensitive characteristics, as claimed in claim 2, wherein said filter substrate comprises a radiation detector array.

13. A radiation filter structure having combined wavelength and polarization sensitive characteristics, as claimed in claim 12, wherein said radiation detector array comprises a focal plane array radiation detector.

14. A radiation filter structure having combined wavelength and polarization sensitive characteristics, as claimed in claim 12, wherein a passivating layer is applied intermediate said radiation detector array and said plurality of different wavelength parallel adjacent filter coating stripes to prevent any damage to the radiation detector array.

* * * * *